United States Patent
Iyengar et al.

(10) Patent No.: US 9,491,545 B2
(45) Date of Patent: Nov. 8, 2016

(54) METHODS AND DEVICES FOR REVERBERATION SUPPRESSION

(71) Applicant: Apple Inc., Cupertino, CA (US)

(72) Inventors: Vasu Iyengar, Pleasanton, CA (US); Martin E. Johnson, Los Gatos, CA (US); Ronald N. Isaac, San Ramon, CA (US); Aram M. Lindahl, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 64 days.

(21) Appl. No.: 14/286,659

(22) Filed: May 23, 2014

(65) Prior Publication Data
US 2015/0341722 A1  Nov. 26, 2015

(51) Int. Cl.
| H04R 3/00 | (2006.01) |
| H04M 9/08 | (2006.01) |
| H04R 3/04 | (2006.01) |
| H04S 7/00 | (2006.01) |
| G10L 21/0208 | (2013.01) |
| H04B 3/23 | (2006.01) |

(52) U.S. Cl.
CPC ............ *H04R 3/005* (2013.01); *H04M 9/082* (2013.01); *H04R 3/04* (2013.01); *H04S 7/305* (2013.01); *G10L 2021/02082* (2013.01); *H04B 3/23* (2013.01); *H04R 2410/05* (2013.01); *H04R 2499/11* (2013.01)

(58) Field of Classification Search
None
See application file for complete search history.

(56) References Cited

U.S. PATENT DOCUMENTS

| 5,740,256 | A | * | 4/1998 | Castello Da Costa et al. ............... 381/94.7 |
| 7,773,743 | B2 | | 8/2010 | Stokes et al. |
| 8,275,120 | B2 | | 9/2012 | Stokes et al. |
| 2008/0219463 | A1 | * | 9/2008 | Liu et al. .............. 381/66 |
| 2011/0268283 | A1 | | 11/2011 | Nakadai et al. |
| 2014/0037094 | A1 | * | 2/2014 | Ma et al. ............... 381/56 |
| 2014/0270216 | A1 | * | 9/2014 | Tsilfidis et al. ............ 381/66 |
| 2015/0221322 | A1 | | 8/2015 | Iyengar et al. |
| 2015/0237445 | A1 | * | 8/2015 | Nackvi ............ H04R 3/04 |

FOREIGN PATENT DOCUMENTS

WO   WO 2012/1666092   12/2012

OTHER PUBLICATIONS

Lollmann, Heinrich W., et al., "An Improved Algorithm for Blind Reverberation Time Estimation", *Proceedings of International Workshop on Acoustic Echo and Noise Control (IWAENC)*, Aug. 2010, 4 pages.
Maas, Roland, et al., "On the Application of Reverberation Suppression to Robust Speech Recognition", *ICASSP*, p. 297-300. IEEE, (2012), 4 pages.

* cited by examiner

*Primary Examiner* — Andrew L Sniezek
(74) *Attorney, Agent, or Firm* — Blakely, Sokoloff, Taylor & Zafman LLP

(57) ABSTRACT

In one embodiment, a process for suppressing reverberation begins with a device of a user obtaining a reverberant speech signal from a voice of the user. The device determines a first estimated reverberation component of the reverberant speech signal. The device generates a first de-reverberated output signal with a first reverberation suppression based on the reverberant speech signal and the first estimated reverberation component. Then, the device generates a second improved reverberation component using the first de-reverberated output signal. The device generates a second de-reverberated output signal with a second reverberation suppression based on the reverberant speech signal and the second improved reverberation component.

24 Claims, 10 Drawing Sheets

METHODS AND DEVICES FOR REVERBERATION SUPPRESSION

An embodiment of the invention relates to audio digital signal processing techniques for reverberation suppression of reverberations for audio devices including a mobile phone (handset) device. Other embodiments are also described.

BACKGROUND

Mobile communication systems allow a mobile phone to be used in different environments such that the voice of the near end user is mixed with a variety of types and levels of background noise surrounding the near end user. Mobile phones now have at least two microphones, a primary or "bottom" microphone, and a secondary or "top" microphone, both of which will pick up both the near-end user's voice and background noise. Speech picked up by a microphone in a typical office or home usually suffers from the phenomenon of reverberation because the speech generated by the talker has a direct path to the microphone as well as other paths due to reflections from walls, ceilings, and other objects. Speech picked up in this manner sounds distant. Automatic speech recognition engines suffer from increased error rates for recognition in these conditions.

SUMMARY

In one embodiment, a process for suppressing reverberations begins with a microphone of a device of a user obtaining a reverberant speech signal that originates from a clean speech signal of a voice (e.g, voice of a user, voice of a person, recorded voice, etc.). The reverberant speech signal is caused by the clean speech signal of the voice being reflected by walls, a ceiling, a floor, or other objects. Next, the device determines a first estimated reverberation component of the reverberant speech signal. The device generates a first de-reverberated output signal with a first reverberation suppression based on the reverberant speech signal and the first estimated reverberation component. Then, the device generates a second improved reverberation component using the first de-reverberated output signal. The first de-reverberated output signal is a closer approximation of the clean speech signal having less reverberation than the actual reverberant speech signal. The device generates a second de-reverberated output signal with a second reverberation suppression based on the reverberant speech signal and the second improved reverberation component. The second de-reverberated output signal can be further processed and transmitted to a device of another user that is talking with the user.

Another embodiment of the invention is an audio device that includes at least one microphone for measuring a reverberant speech signal and audio signal processing circuitry that is coupled to the microphone. The audio signal processing circuitry determines a first estimated reverberation component of the reverberant speech signal that is received by the at least one microphone and generates a first de-reverberated output signal with a first reverberation suppression based on the reverberant speech signal and the first estimated reverberation component. The audio signal processing circuitry also determines a second improved reverberation component using the first de-reverberated output signal, and generates a second de-reverberated output signal with a second reverberation suppression based on the reverberant speech signal and the second improved reverberation component.

The first estimated reverberation component may be based on a convolution of the reverberant speech signal and a second portion of a first synthetic impulse response. The first reverberation component and the second improved reverberation component may be based on a reverberation time $T_{60}$ that is defined as the time take for the energy in a reverberant room to decay by 60 dB. The reverberation time $T_{60}$ is a frequency dependent term that tailors an exponential decay as a function of frequency. The second improved reverberation component may be based on a convolution of the first de-reverberated output signal and a second portion of a second synthetic impulse response. The first synthetic impulse response is time delayed in comparison to the second synthetic impulse response.

In another aspect, an apparatus includes a means for measuring a reverberant speech signal and a means for audio signal processing to determine a first estimated reverberation component of the reverberant speech signal that is received by at least one microphone of the apparatus. The means for audio signal processing also generates a first de-reverberated output signal with a first reverberation suppression based on the reverberant speech signal and the first estimated reverberation component, determines a second improved estimated reverberation component using the first de-reverberated output signal, and generates a second de-reverberated output signal with a second reverberation suppression based on the reverberant speech signal and the second improved reverberation component.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 5A illustrates an actual impulse response 510 while

FIG. 6A illustrates a synthetic impulse response 610 while

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
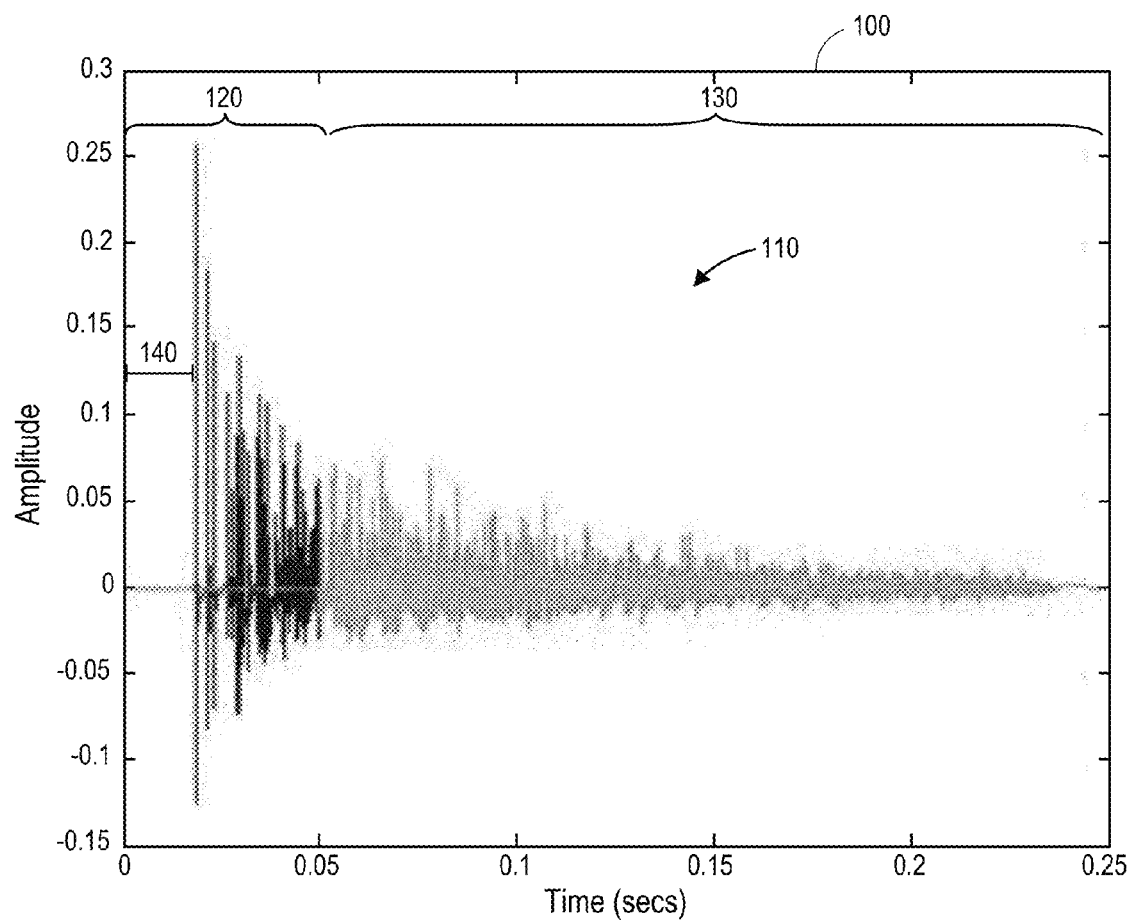
FIG. 1 shows an example of a room impulse response (RIR) between a user that is talking and a microphone a certain distance from the user in a reverberant room in accordance with one embodiment.

FIG. 1 shows an example of a room impulse response (RIR) between a user that is talking and a microphone a certain distance from the user in a reverberant room in accordance with one embodiment. The plot 100 shows the RIR 110 which typically has an exponential decay in terms of amplitude versus time (seconds). A main peak with largest amplitude in a first portion 120 is due to a direct path between the user that is talking and the microphone while other paths due to reflections from the walls and ceiling of the room result in a second portion 130 having a reduced amplitude. The speech picked up by the microphone is a convolution of the speech signal from the user and this impulse response. The RIR 110 has an undesirable reverberant characteristic. The RIR 110 can be separated into the first portion 120, which is approximately 50 milliseconds and considered the direct part, while the second portion 130, which is beyond 50 milliseconds, is the reverberant component. A user begins talking at time=0 and a practical processing delay 140 occurs prior to the main peak of the first portion.

Embodiments of the present invention process the microphone signal to reduce the reverberant characteristics. If the impulse response is known and is also minimum phase, then the impulse response can be inverted to undo the filtering effect. However, this impulse response is not known and even if known it is generally not minimum phase. In one embodiment, the process includes suppression of the reverberant components of the measured signal from the microphone. The process is motivated by a high level processing operations of a noise suppression algorithm.

Figure 2:
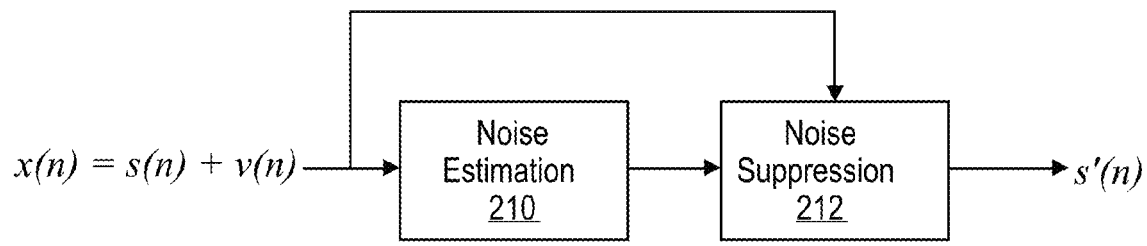
FIG. 2 illustrates an exemplary overview of a noise suppression algorithm in accordance with one embodiment.

FIG. 2 illustrates an exemplary overview of a noise suppression algorithm in accordance with one embodiment. A noise estimate 210 is first obtained from the following equation:

$$x(n)=s(n)+v(n)$$

where s(n) is the speech signal from the user and v(n) is the noise. A suppression block 212 then yields an output speech estimate s'(n). The noise estimate can be obtained using a minimum statistics approach for example and the noise suppression can be obtained using dynamic Wiener filtering or variations of this concept such as Magnitude Spectral Subtraction, Power Spectral Subtraction, etc.

Figure 3:
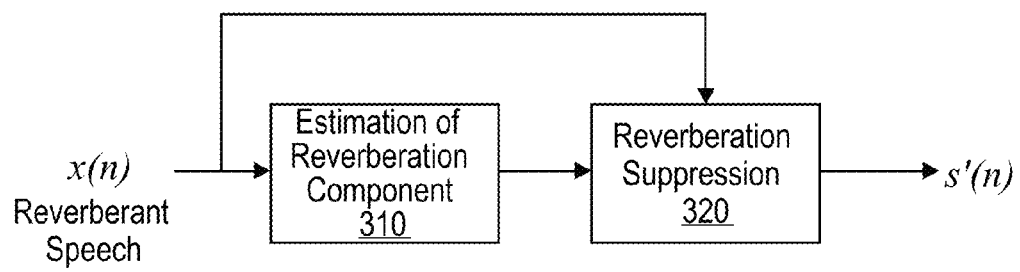
FIG. 3 illustrates an exemplary overview of reverberation suppression using a one pass approach in accordance with one embodiment.

FIG. 3 illustrates an exemplary overview of reverberation suppression using a one pass approach in accordance with one embodiment. A reverberation component is initially estimated at block 310 based on a reverberant speech signal x(n) followed by a reverberation suppression at block 320, which generates an output signal s'(n). A reverberation tail component (e.g., second portion 130) is treated like noise in this embodiment and is suppressed like noise.

As mentioned above, the RIR can be split in time in a direct first portion and a reverberant second portion with the equation:

$$RIR(n)=RIR_D(n)+RIR_R(n),$$

where $RIR_R(n)$ is the direct first portion 120 and $RIR_R(n)$ is the reverberant second portion 130 in FIG. 1. If s(n) is an ideal clean speech signal as would be picked up by a microphone in an ideal environment, then the following equation:

$$x(n)=s(n)*RIR(n) \text{ is the observed reverberant signal}$$
$$\text{with * being a convolution.}$$

The ideal reverberation component is given by the equation:

$$r_I(n)=s(n)*RIR_R(n)$$

However, s(n) is typically not available in practice. A reasonable first approximation to $r_I(n)$ is given by the equation:

$$r_E(n)=x(n)*RIR_R(n)$$

Figure 4:
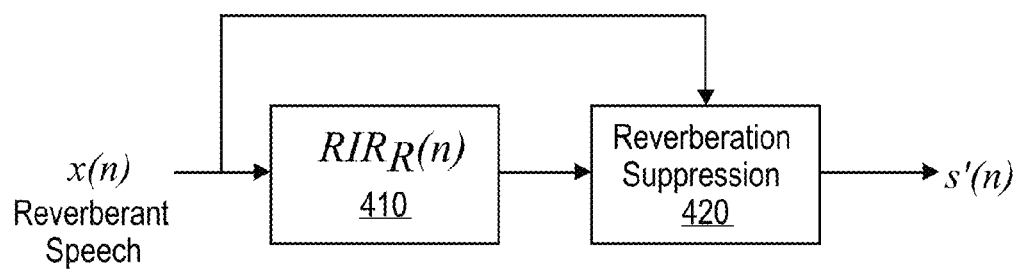
FIG. 4 illustrates an exemplary overview of obtaining a reverberation estimate based on $x(n)*RIR_R(n)$ with a one pass approach in accordance with one embodiment.

FIG. 4 illustrates an exemplary overview of obtaining a reverberation estimate based on $x(n)*RIR_R(n)$ with a one pass approach in accordance with one embodiment. A reverberant speech signal x(n) as measured by a microphone is provided as an input for $RIR_R(n)$ at block 410 and for reverberation suppression at block 420. The reverberation suppression at block 420 receives an output control signal from block 410 in a time domain, which may be translated into a frequency domain for the reverberation suppression, and outputs a signal s'(n) with suppressed reverberation. This exemplary overview provides a reasonable result for reverberation suppression, but may suffer from mild suppression artifacts. Also, $RIR_R(n)$ is not known in general and reasonable approximations to this will now be discussed.

The RIR of a room in general has an envelope that decays exponentially with time. $RIR_R(n)$ is typically modeled as a discrete random process with some amplitude and an exponential decay. The energy decay curve can be expressed in continuous time as follows:

$$E_d(t)=A^2e^{-2p}$$

where $E_d(t)$ is the sound energy, A is the amplitude, and p is the decay constant. Reverberation time $T_{60}$ is defined as the time taken for the energy in a reverberant room to decay by 60 dB as expressed in the following equation:

$$10*\log 10[E_d(0)/E_d(T_{60})]=60$$

$T_{60}$ is related to p according to the equation:

$$T_{60}=3/p*\log 10(e)=6.908/p$$

For the purpose of reverberation suppression, RIR(n) is approximated by an impulse response that can be estimated in different ways including using a Gaussian Noise with an exponential decay. The decay rate p is obtained by first estimating the $T_{60}$ time or other suitable reverberant characteristics and then using the above equation to obtain p. A time domain approach for computing the $RIR_R(n)$ is preferred, but a frequency domain approach is also possible.

The $T_{60}$ time can be a frequency dependent term that tailors or adjusts an exponential decay as a function of frequency. A high frequency band may have a first decay rate while a low frequency band may have a second decay rate that is different than the first decay rate.

Figure 5A:
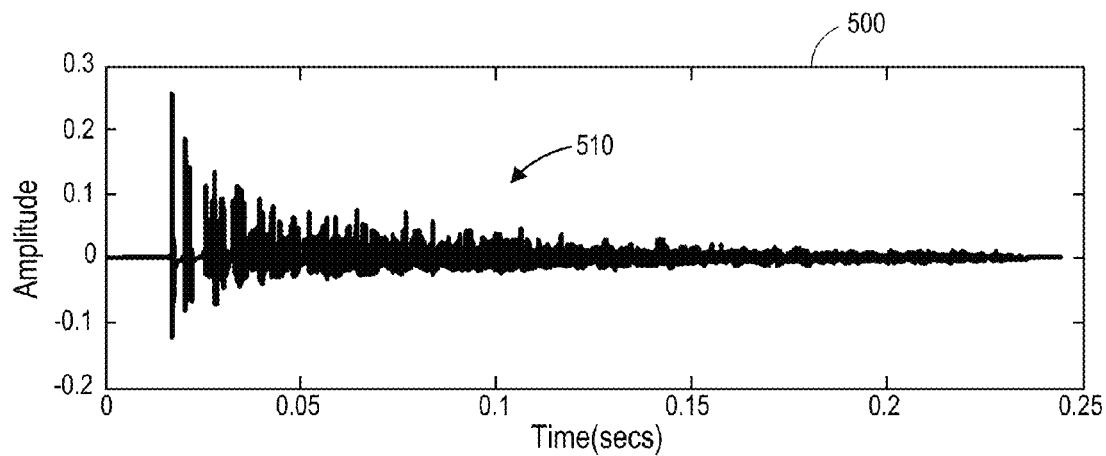
Figure 5B:
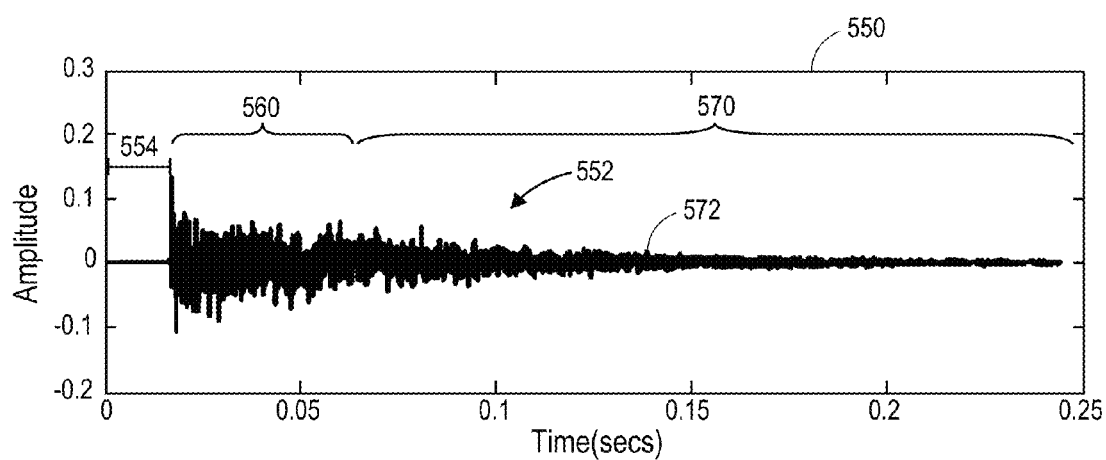
FIG. 5B illustrates a synthetic impulse response 552 for a one pass approach obtained with an estimated $T_{60}$ time in accordance with one embodiment.

FIG. 5A illustrates an actual impulse response 510 while FIG. 5B illustrates a synthetic impulse response 552 for a one pass approach obtained with an estimated $T_{60}$ time in accordance with one embodiment. In this example, the synthetic response is generated with a $T_{60}$ time of 0.46 seconds. The $T_{60}$ time can be estimated for different environments.

In another embodiment, an echo canceller can be used for estimating the $T_{60}$ time. An echo canceller is generally used for canceling an echo in a two-way communication in which a near-end user talks into a microphone of a device of this near-end user and receives an audio signal of a voice of a far-end user via a speaker of this device. However, the microphone also captures the audio signal generated by the speaker of the same device and generates an echo of the voice of the far-end user that is then sent to the far-end user via the microphone of the near-end user. The far-end user then hears a delayed echo of his or her voice.

Returning to FIG. 5A, the plot 500 illustrates an actual RIR 510. For a reverberation estimate, the reverberant tail portion of the synthetic response illustrated in FIG. 5b is used. FIG. 5b illustrates a synthetic response in accordance with one embodiment. The synthetic response 552 of plot 550 includes a first portion 560 of approximately 50 milliseconds and a second portion 570 that starts after the first portion. In another embodiment, the first portion has a time period of 30 to 80 milliseconds. In an embodiment, the first portion is frequency dependent. A shorter delay (e.g., less than 50 milliseconds) may be appropriate for higher frequencies. A longer delay (e.g., more than 50 milliseconds may be appropriate for lower frequencies. FIG. 5b illustrates a reverberant component 572 and corresponding second portion 570 in accordance with one embodiment. The practical processing delay 554 represents a processing delay from when a user starts to talk until the beginning of the generation of the speech signal.

Figure 6A:
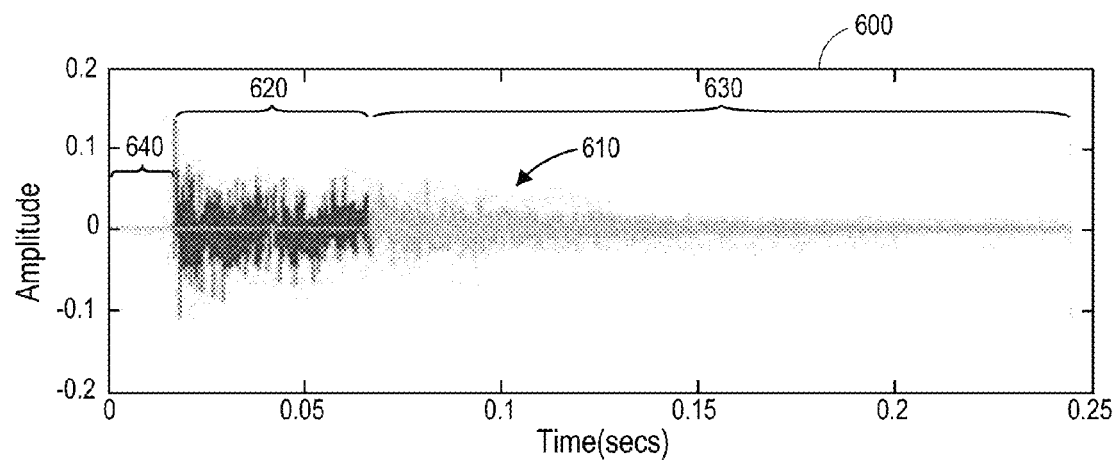
Figure 6B:
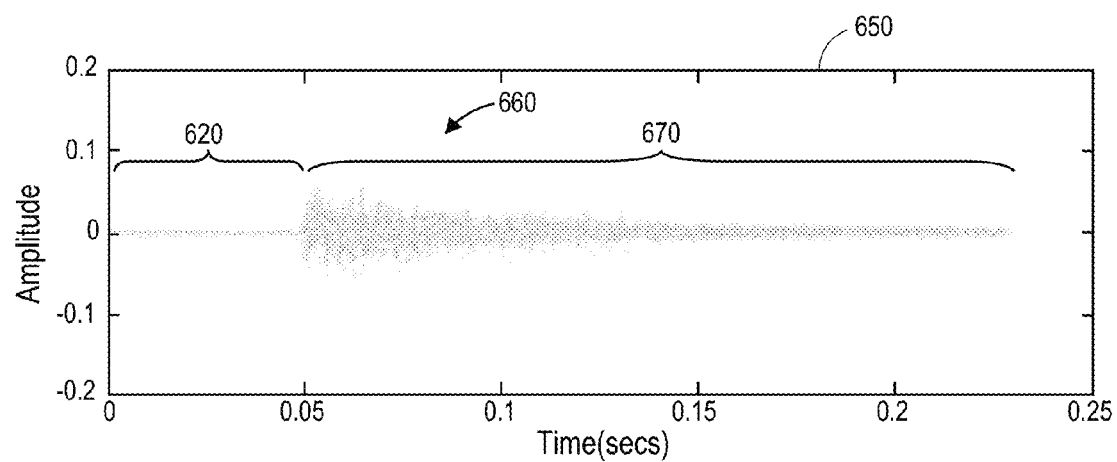
FIG. 6B illustrates a reverberant component of the synthetic impulse response 610 in accordance with one embodiment.

FIG. 6A illustrates a synthetic impulse response 610 while FIG. 6B illustrates a reverberant component of the synthetic impulse response 610 in accordance with one embodiment. The plot 600 illustrates a practical processing delay 640, a first portion 620 having a time period of approximately 50 milliseconds, and a second portion 630 having a reverberant component. For a reverberation estimate, the reverberant tail portion of the synthetic response illustrated in FIG. 6A is used. FIG. 6B illustrates a synthetic response 660 (IRA) with the reverberant component in accordance with one embodiment. The synthetic response 660 of plot 650 includes a first portion 620 of approximately 50 milliseconds and a second portion 670 that starts after the first portion. The practical delay has been removed from FIG. 6B. In another embodiment, the first portion has a time period of 30 to 80 milliseconds. In an embodiment, the first portion is frequency dependent. The reverberation component r'(n) is computed as $r'(n)=x(n)*IR_L(n)$.

Another aspect of embodiment of the present invention is control of a frequency response of $IR_L(n)$. In general, the reverberation is high for low frequencies and falls off at higher frequencies. The $T_{60}$ time drops as a function of frequency. Thus, the frequency response of $IR_L(n)$ is shaped accordingly. The frequency response of $IR_L(n)$ will change depending on dimensions and acoustic characteristics of a given room.

Figure 7:
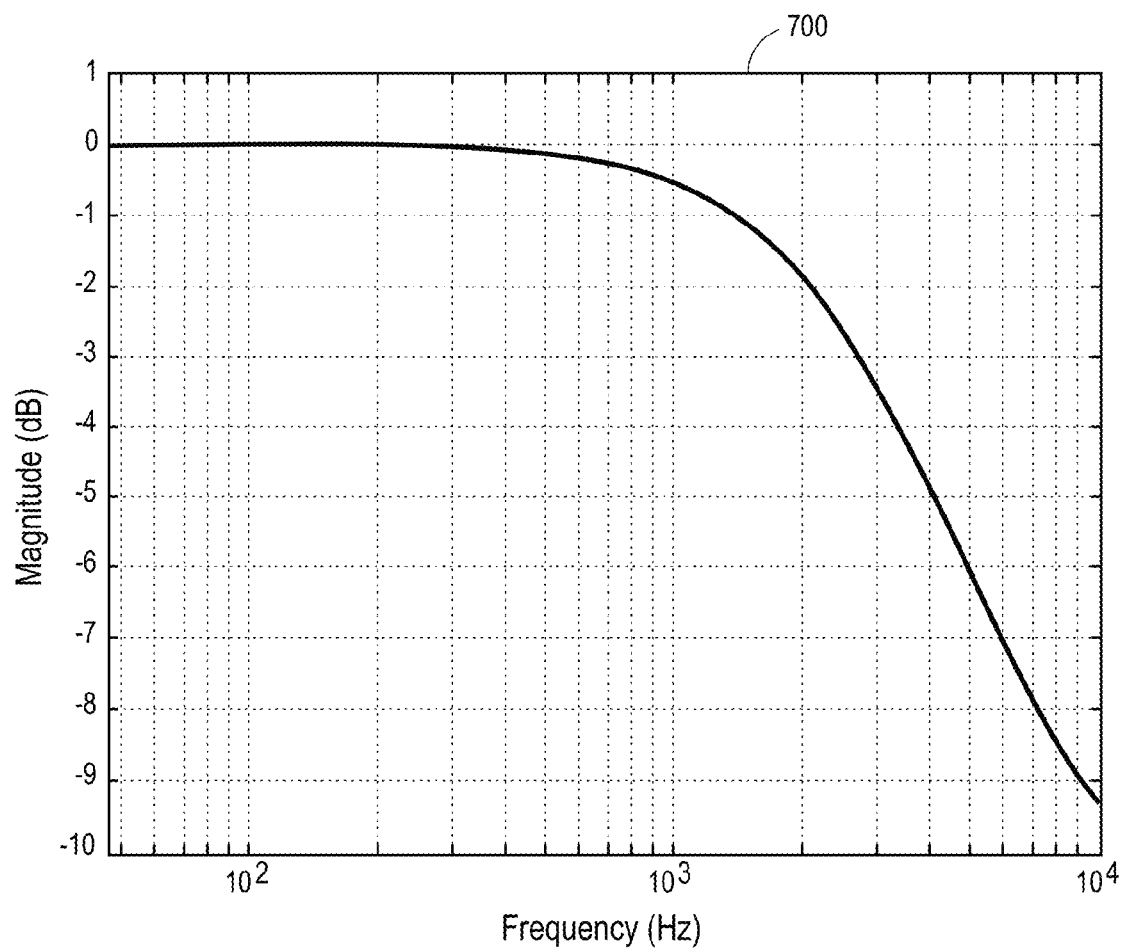
FIG. 7 shows an example of frequency shaping of $IR_L(n)$ in accordance with one embodiment.

FIG. 7 shows an example of frequency shaping of $IR_L(n)$ in accordance with one embodiment. The plot 700 illustrates magnitude of $IR_L(n)$ versus frequency. $IR_L(n)$ decreases as frequency increases particularly for frequencies of 1 kHz or greater. $IR_L(n)$ may be converted from a time domain to a frequency domain and then filtered. In an embodiment, a frequency dependent $T_{60}$ time eliminates a need for frequency shaping of $IR_L(n)$.

Figure 8:
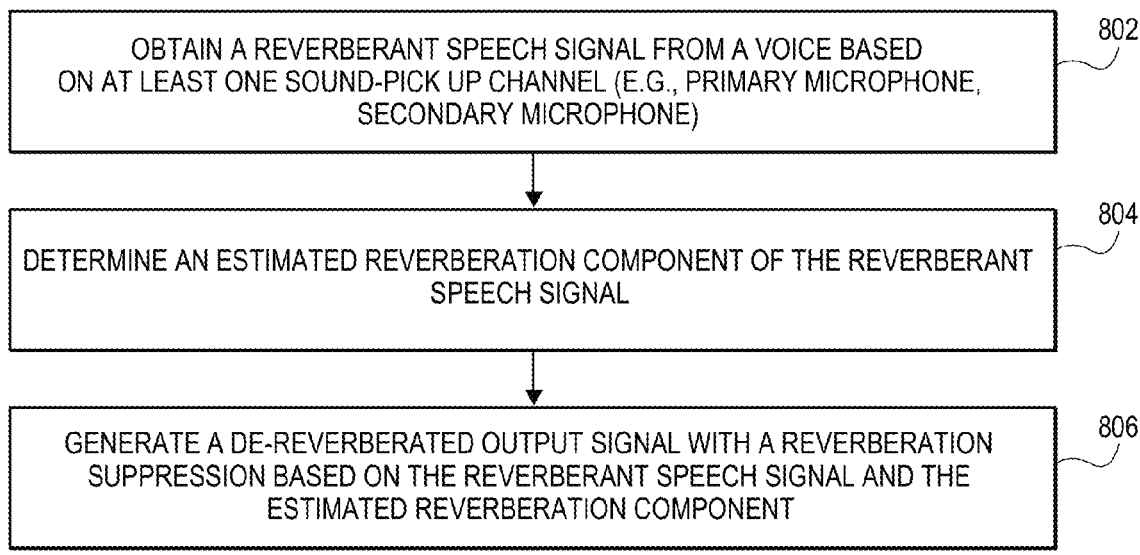
FIG. 8 depicts a flow diagram of a process for reverberation suppression using a one pass approach for an audio device in accordance with one embodiment.

FIG. 8 depicts a flow diagram of a process for reverberation suppression using a one pass approach for an audio device in accordance with one embodiment. The operational flow of method 800 may be executed by an apparatus or system or electronic device, which includes processing circuitry or processing logic. The processing logic may include hardware (circuitry, dedicated logic, etc.), software (such as is run on a general purpose computer system or a dedicated machine or a device), or a combination of both. In one embodiment, an electronic device performs the operations of method 800.

Figure 9:
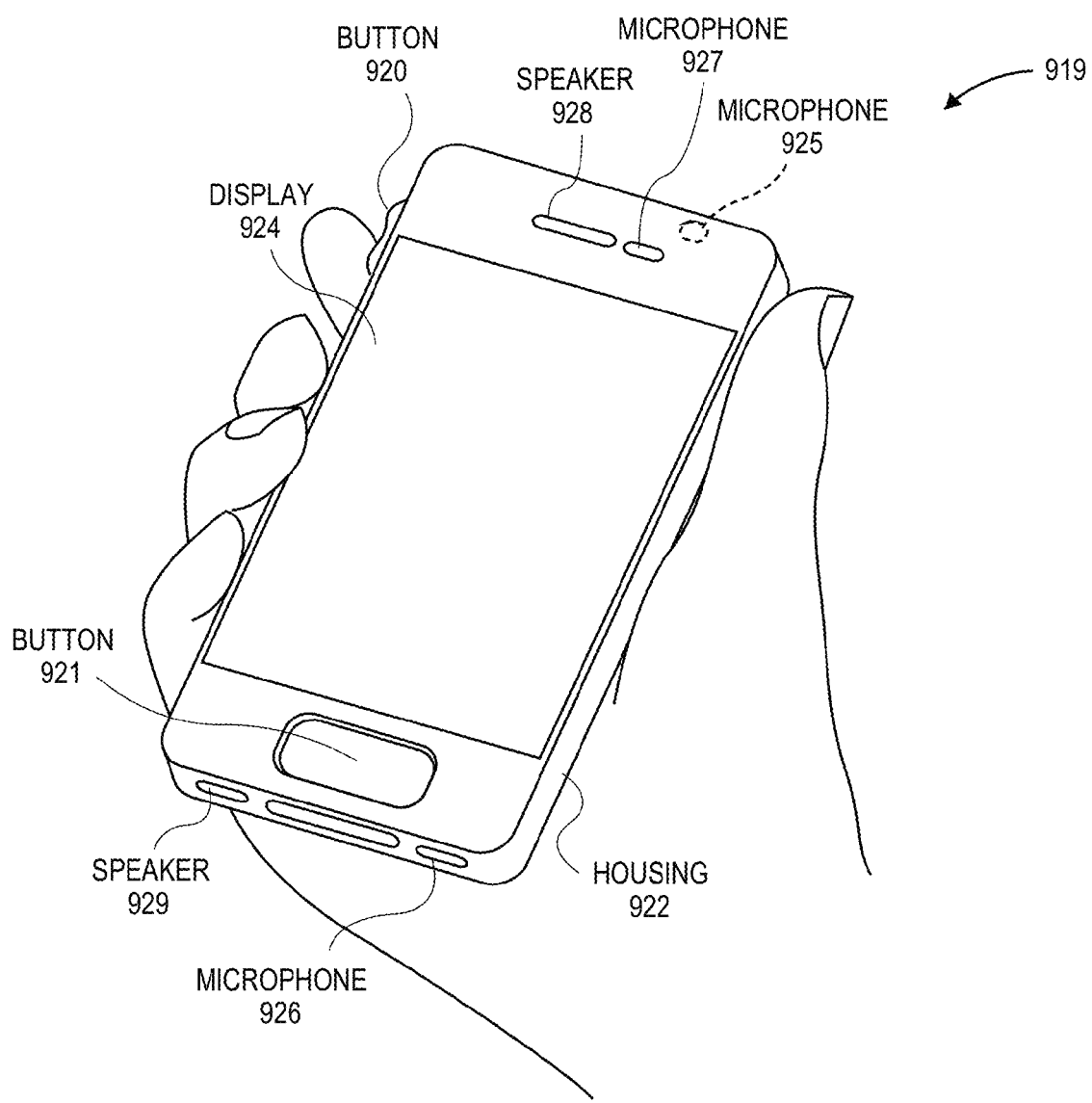
FIG. 9 depicts an example of a mobile device 919 being a smart phone in which an embodiment of the invention may be implemented.

The process uses at least one sound-pick up channel (e.g., primary channel of primary microphone, secondary channel of secondary microphone), which are produced by at least one microphone circuit. In the case where the process is running in an otherwise typical mobile phone that is being used in handset mode (or against-the-ear use), a first microphone circuit produces a signal from a single acoustic microphone that is closer to the mouth (e.g., the bottom or talker microphone) of a user, while a second microphone circuit produces a signal from a single acoustic microphone that is farther from the mouth (e.g., the top microphone or reference microphone, not the error microphone) of the user. FIG. 9 depicts an example of a mobile device 919 being a smart phone in which an embodiment of the invention may be implemented. In this case, the first microphone circuit includes a top microphone 925, while the second microphone circuit includes a bottom microphone 926. The housing 922 also includes an error microphone 927 that is located adjacent to the earpiece speaker (receiver) 928. More generally however, the microphone circuits represent any audio pick up subsystem that generates two sound pick-up or audio channels, namely one that picks up primarily a talker's voice and the other the ambient or background. For example, a sound pickup beam forming process with a microphone array can be used, to create the two audio channels, for instance as one beam in the direction of an intended talker and another beam that has a null in that same direction. The device also includes buttons 920 and 921, speaker 929, and display 924.

Returning to the flow diagram in FIG. 8, the process begins with a device obtaining a reverberant speech signal from a clean speech signal of a voice (e.g, voice of a user, voice of a person, recorded voice, etc.) based on at least one sound-pick up channel (e.g., primary microphone, secondary microphone) at operation 802. For example, a primary microphone may obtain the reverberant speech signal or both primary and secondary microphones may be used. In another embodiment, a sound pickup beam forming process with a microphone array can be used, to create the two audio channels, for instance as one beam in the direction of an intended talker and another beam that has a null in that same direction. The reverberant speech signal is caused by the voice being reflected by walls, a ceiling, a floor, or other objects and then received by at least one sound-pick up channel. Next, the device determines an estimated reverberation component of a reverberant speech signal that is measured by a microphone of the audio device at operation 804. The device generates a de-reverberated output signal with a reverberation suppression based on the reverberant speech signal and the estimated reverberation component at operation 806. The de-reverberated output signal may be further processed and transmitted to another device (e.g., device of another person that is talking with the user).

The estimated reverberation component can be based on a convolution of the reverberant speech signal and a second portion of a synthetic impulse response. The estimated reverberation component can be determined in a time domain. The synthetic impulse response depends upon frequency with reverberation decreasing for higher frequencies. The reverberant speech signal includes a first portion that corresponds to a direct path from a user to the microphone and a second portion that corresponds to other paths from the user to the microphone based on reflections from walls, a ceiling, a floor, or other objects.

Figure 10:
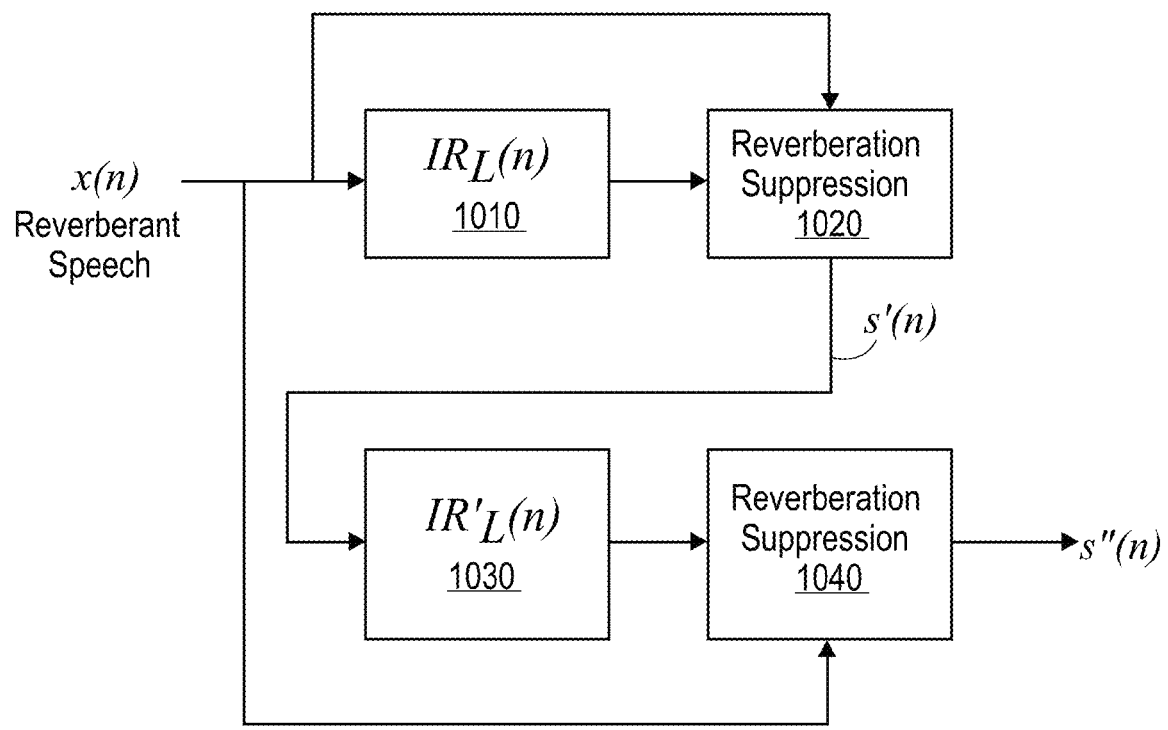
FIG. 10 illustrates a two pass process for reverberation suppression in accordance with one embodiment.

FIG. 10 illustrates a two pass process for reverberation suppression in accordance with one embodiment. If s'(n) denotes a de-reverberated output obtained by suppression of the reverberation in x(n) and r'(n) is used as the estimate of the reverberation, then r(n)=s(n)*$IR_L$(n) is a better estimate of the reverberation. Unfortunately, s(n) is not available. However, s'(n) is a closer estimate of s(n). This suggests a two pass approach as illustrated in FIG. 10 with the second pass using the estimate r'(n)=s'(n)*$IR_L$(n) to suppress the reverberation in the original x(n).

A reverberant speech signal x(n) as measured by at least one microphone of a device is provided as an input for $IR_L$(n) at block 1010 and for reverberation suppression at block 1020. The reverberation suppression at block 1020 receives an output control signal from block 1010 in a time domain, which may be translated into a frequency domain for the reverberation suppression, and outputs a signal s'(n) with suppressed reverberation. The signal s'(n) is input into $IR'_L$(n) at block 1030, which outputs a control signal to reverberation suppression ($2^{nd}$ pass) at block 1040. This block also receives x(n) and generates output signal s"(n). A first synthetic impulse response ($IR_L$(n)) is time delayed (e.g., time delayed by a frame size or block size of 8 to 16 milliseconds) in comparison to a second synthetic impulse response ($IR'_L$(n)).

In one embodiment, the frame size or block size associated with the frequency domain processing in the suppression block(s) is usually in a range of 8 to 16 milliseconds. Adjacent frames or blocks may be processed with some overlap (e.g., 50% overlap) to prevent error in transitioning from one frame or block to the next one. Since this time period is less than a practical processing delay for $IR_L$(n) to receive an audio speech signal, the operations in FIG. 10 will cause no increase in latency or delay. It is also possible to extend the two pass approach to additional passes with the reverberation suppression but this will be at the expense of increased computation. The amount of suppression in each stage (pass) can be set independently to provide the best subjective quality as predetermined or determined by a user. A two pass approach can provide a significant improvement in audio quality in comparison to a single pass approach. The two pass approach is also very robust to estimation errors of the $T_{60}$ time of the reverberant room.

The process is performed predominantly in the time domain, and on a per frame basis (a frame of the digitized audio signal), although operations can also be performed in the frequency domain.

Figure 11:
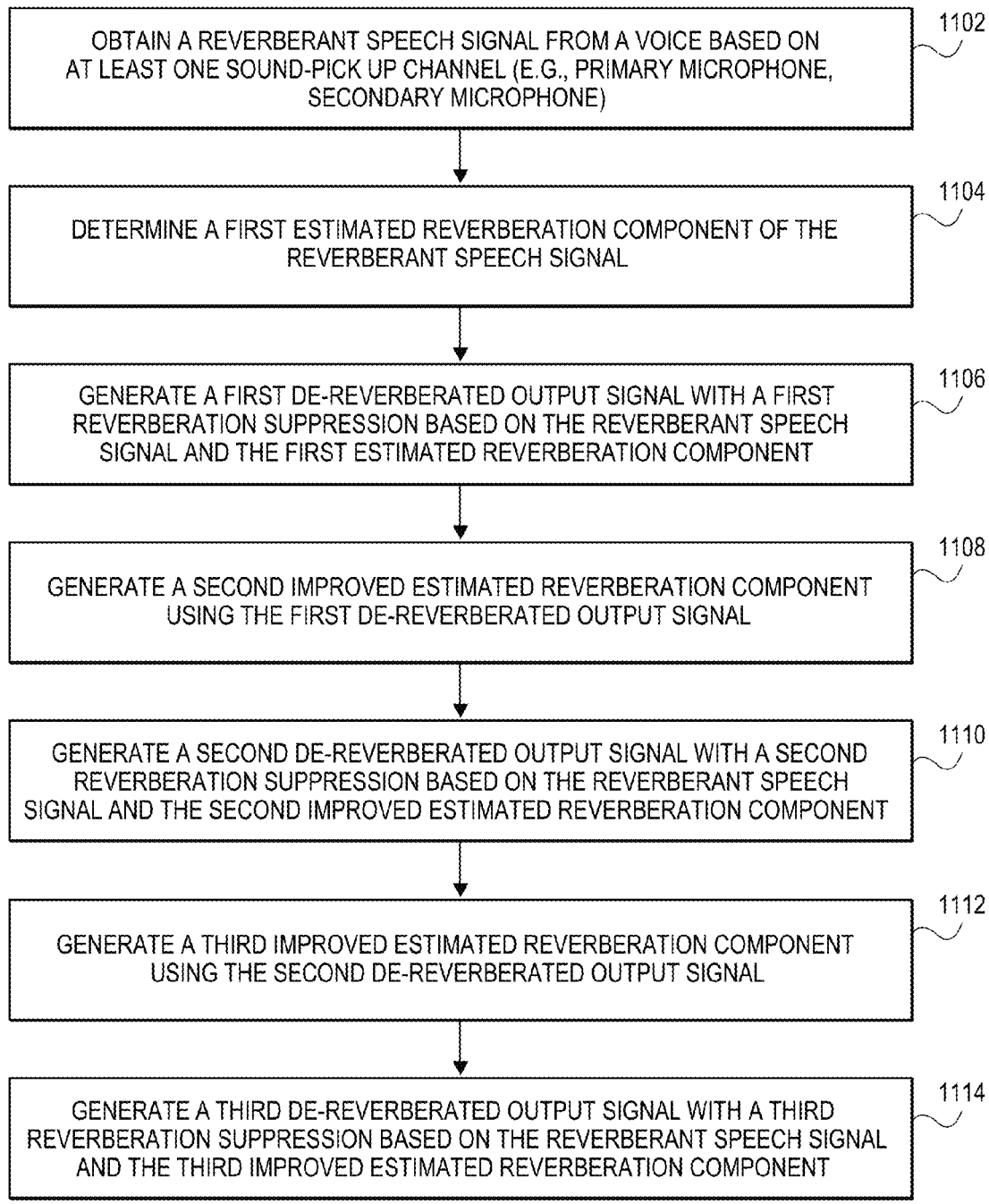
FIG. 11 depicts a flow diagram of a process for reverberation suppression using a multiple pass approach for an audio device in accordance with one embodiment.

FIG. 11 depicts a flow diagram of a process for reverberation suppression using a multiple pass approach for an audio device in accordance with one embodiment. The operational flow of method 1100 may be executed by an apparatus or system or electronic device, which includes processing circuitry or processing logic. The processing logic may include hardware (circuitry, dedicated logic, etc.), software (such as is run on a general purpose computer system or a dedicated machine or a device), or a combination of both. In one embodiment, an electronic device performs the operations of method 1100.

The process begins with a device obtaining a reverberant speech signal from an original clean speech signal of a voice (e.g, voice of a user, voice of a person, recorded voice, etc.) based on at least one sound-pick up channel (e.g., primary microphone, secondary microphone) at operation 1102. For example, a primary microphone may obtain the reverberant speech signal or both primary and secondary microphones may be used. In another embodiment, a sound pickup beam forming process with a microphone array can be used, to create the two audio channels, for instance as one beam in the direction of an intended talker and another beam that has a null in that same direction. The reverberant speech signal is caused by the voice being reflected by walls, a ceiling, a floor, or other objects and then received by at least one sound-pick up channel. Next, the device determines a first estimated reverberation component of the reverberant speech signal that is measured by a microphone of the audio device at operation 1104.

The device generates a first de-reverberated output signal with a first reverberation suppression based on the reverberant speech signal and the first estimated reverberation component at operation 1106. Then, the device generates a second improved estimated reverberation component using the first de-reverberated output signal at operation 1108. The first de-reverberated output signal is a closer approximation of the clean speech signal having less reverberation than the actual reverberant speech signal. The device generates a second de-reverberated output signal with a second reverberation suppression based on the reverberant speech signal and the second improved estimated reverberation component at operation 1110.

The device may perform additional passes with reverberation suppression. For example, the device may generate a third improved estimated reverberation component using the second de-reverberated output signal at operation 1112. The second de-reverberated output signal is a closer approximation of the clean speech signal having less reverberation than the actual reverberant speech signal. The second de-reverberated output signal also has less reverberation than the first de-reverberated output signal. The device generates a third de-reverberated output signal with a third reverberation suppression based on the reverberant speech signal and the third improved estimated reverberation component at operation 1114.

In one embodiment, the first estimated reverberation component is based on a convolution of the reverberant speech signal and a second portion of a first synthetic impulse response. The first synthetic impulse response depends upon frequency with reverberation decreasing for higher frequencies.

The second estimated reverberation component is based on a convolution of the first de-reverberated output signal and a second portion of a second synthetic impulse response.

Figure 12:
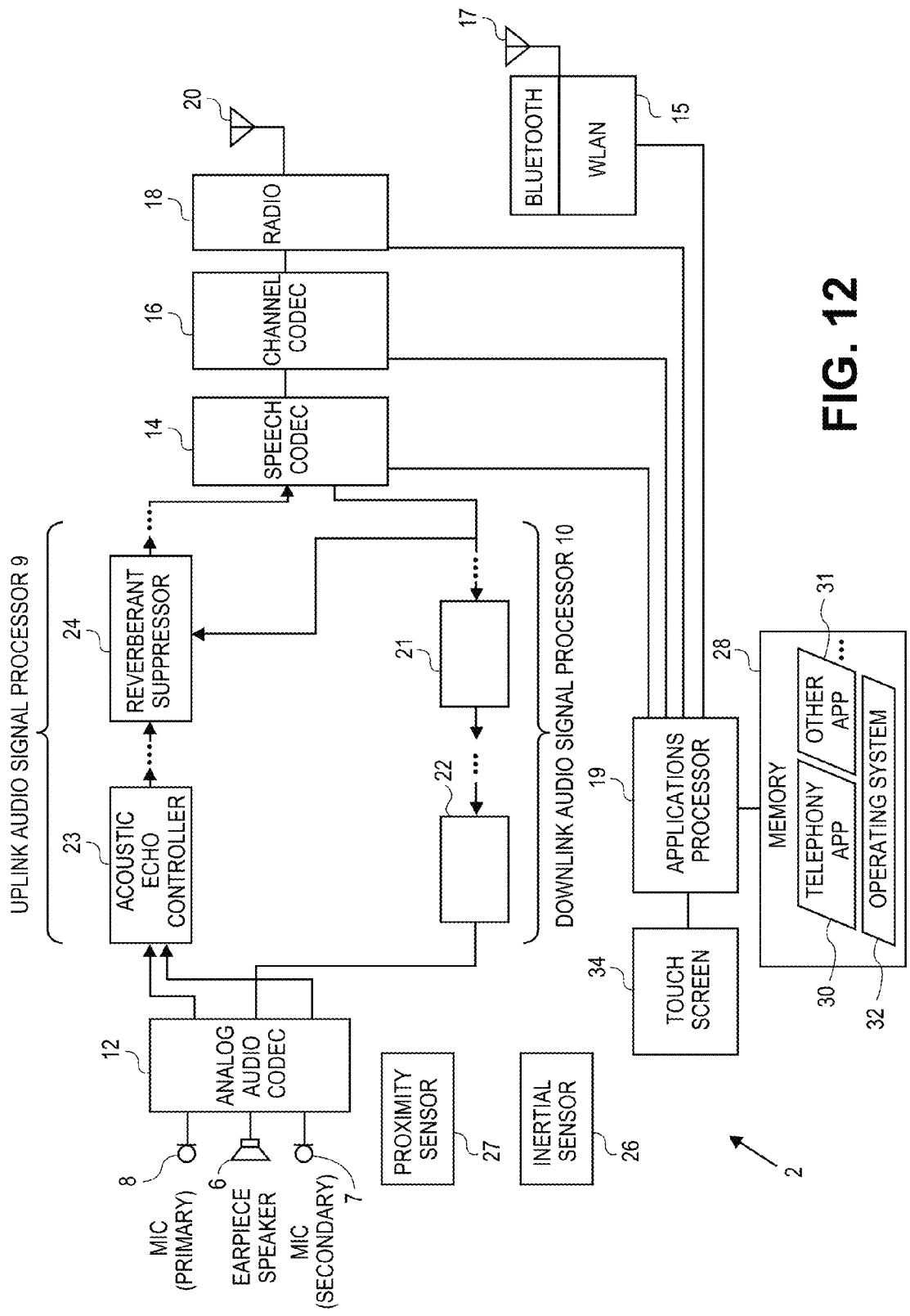
FIG. 12 illustrates a block diagram of some of the functional unit blocks of a mobile device relevant to reverberant suppression in accordance with one embodiment.

FIG. 12 illustrates a block diagram of some of the functional unit blocks of a mobile device relevant to reverberant suppression in accordance with one embodiment.

These include constituent hardware components such as those, for instance, of an iPhone™ device by Apple Inc. Although not shown, the device 2 has a housing in which the primary mechanism for visual and tactile interaction with its user is a touch sensitive display screen (touch screen 34). As an alternative, a physical keyboard may be provided together with a display-only screen. The housing may be essentially a solid volume, often referred to as a candy bar or chocolate bar type, as in the iPhone™ device. Alternatively, a moveable, multi-piece housing such as a clamshell design or one with a sliding physical keyboard may be provided. The touch screen 34 can display typical user-level functions of visual voicemail, web browser, email, digital camera, various third party applications (or "apps"), as well as telephone features such as a virtual telephone number keypad that receives input from the user via touch gestures.

The user-level functions of the mobile device 2 are implemented under the control of an applications processor 19 or a system on a chip (SoC) that is programmed in accordance with instructions (code and data) stored in memory 28 (e.g., microelectronic non-volatile random access memory). The terms "processor" and "memory" are generically used here to refer to any suitable combination of programmable data processing components and data storage that can implement the operations needed for the various functions of the device described here. An operating system 32 may be stored in the memory 28, with several application programs, such as a telephony application 30 as well as other applications 31, each to perform a specific function of the device when the application is being run or executed. The telephony application 30, for instance, when it has been launched, unsuspended or brought to the foreground, enables a near-end user of the device 2 to "dial" a telephone number or address of a communications device 4 of the far-end user, to initiate a call, and then to "hang up" the call when finished.

For wireless telephony, several options are available in the device 2 as depicted in FIG. 12. A cellular phone protocol may be implemented using a cellular radio 18 that transmits and receives to and from a base station 5 using an antenna 20 integrated in the device 2. As an alternative, the device 2 offers the capability of conducting a wireless call over a wireless local area network (WLAN) connection, using the Bluetooth/WLAN radio transceiver 15 and its associated antenna 17. The latter combination provides the added convenience of an optional wireless Bluetooth headset link. Packetizing of the uplink signal, and depacketizing of the downlink signal, for a WLAN protocol may be performed by the applications processor 19.

The uplink and downlink signals for a call that is conducted using the cellular radio 18 can be processed by a channel codec 16 and a speech codec 14 as shown. The speech codec 14 performs speech coding and decoding in order to achieve compression of an audio signal, to make more efficient use of the limited bandwidth of typical cellular networks. Examples of speech coding include half-rate (HR), full-rate (FR), enhanced full-rate (EFR), and adaptive multi-rate wideband (AMR-WB). The latter is an example of a wideband speech coding protocol that transmits at a higher bit rate than the others, and allows not just speech but also music to be transmitted at greater fidelity due to its use of a wider audio frequency bandwidth. Channel coding and decoding performed by the channel codec 16 further helps reduce the information rate through the cellular network, as well as increase reliability in the event of errors that may be introduced while the call is passing through the network (e.g., cyclic encoding as used with convolutional encoding, and channel coding as implemented in a code division multiple access, CDMA, protocol). The functions of the speech codec 14 and the channel codec 16 may be implemented in a separate integrated circuit chip, sometimes referred to as a baseband processor chip. It should be noted that while the speech codec 14 and channel codec 16 are illustrated as separate boxes, with respect to the applications processor 19, one or both of these coding functions may be performed by the applications processor 19 provided that the latter has sufficient performance capability to do so.

The applications processor 19, while running the telephony application program 30, may conduct the call by enabling the transfer of uplink and downlink digital audio signals (also referred to here as voice or speech signals) between itself or the baseband processor on the network side, and any user-selected combination of acoustic transducers on the acoustic side. The downlink signal carries speech of the far-end user during the call, while the uplink signal contains speech of the near-end user that has been picked up by the primary microphone 8. The acoustic transducers include an earpiece speaker 6 (also referred to as a receiver), a loud speaker or speaker phone (not shown), and one or more microphones including the primary microphone 8 that is intended to pick up the near-end user's speech primarily, and a secondary microphone 7 that is primarily intended to pick up the ambient or background sound. The analog-digital conversion interface between these acoustic transducers and the digital downlink and uplink signals is accomplished by an analog audio codec 12. The latter may also provide coding and decoding functions for preparing any data that may need to be transmitted out of the mobile device 2 through a connector (not shown), as well as data that is received into the device 2 through that connector. The latter may be a conventional docking connector that is used to perform a docking function that synchronizes the user's personal data stored in the memory 28 with the user's personal data stored in the memory of an external computing system such as a desktop or laptop computer.

Still referring to FIG. 12, an audio signal processor is provided to perform a number of signal enhancement and noise reduction operations upon the digital audio uplink and downlink signals, to improve the experience of both near-end and far-end users during a call. This processor may be viewed as an uplink audio signal processor 9 and a downlink audio signal processor 10, although these may be within the same integrated circuit die or package. Again, as an alternative, if the applications processor 19 is sufficiently capable of performing such functions, the uplink and downlink audio signal processors 9, 10 may be implemented by suitably programming the applications processor 19. Various types of audio processing functions may be implemented in the downlink and uplink signal paths of the processors 9, 10.

The downlink signal path receives a downlink digital signal from either the baseband processor (and speech codec 14 in particular) in the case of a cellular network call, or the applications processor 19 in the case of a WLAN/VOIP call. The signal is buffered and is then subjected to various functions, which are also referred to here as a chain or sequence of functions. These functions are implemented by downlink processing blocks or audio signal processors 21, 22 that may include, one or more of the following which operate upon the downlink audio data stream or sequence: a noise suppressor, a voice equalizer, an automatic gain control unit, a compressor or limiter, and a side tone mixer.

The uplink signal path of the audio signal processor 9 passes through a chain of several processors that may include an acoustic echo canceller 23, an automatic gain control block, an equalizer, a compander or expander, and a reverberant suppressor 24 (e.g., blocks 310 and 320, blocks 410 and 420, blocks 1010-1040). The latter is to reduce the amount of reverberant sound that is in the talker signal coming from the primary microphone 8. Examples of reverberant suppression processes or algorithms are the one pass and multiple pass techniques as discussed herein where the audio signal from the primary microphone 8 is analyzed to detect and then suppress what appears to be reverberant noise components.

In one embodiment, an audio device (e.g., device 2) includes at least one microphone for measuring a reverberant speech signal and audio signal processing circuitry (e.g., audio signal processor 9, 10) coupled to the microphone. The audio signal processing circuitry determines a first estimated reverberation component of the reverberant speech signal that is received by the microphone, generates a first de-reverberated output signal with a first reverberation suppression based on the reverberant speech signal and the first estimated reverberation component, generates a second improved reverberation component using the first de-reverberated output signal, and generates a second de-reverberated output signal with a second reverberation suppression based on the reverberant speech signal and the second improved reverberation component.

The first estimated reverberation component can be based on a convolution of the reverberant speech signal and a second portion of a first synthetic impulse response. The first and second reverberation components can be based on a reverberation time $T_{60}$ that is defined as the time take for the energy in a reverberant room to decay by 60 dB.

In an embodiment, the reverberation time $T_{60}$ is a frequency dependent term that adjusts an exponential decay as a function of frequency.

The second improved reverberation component can be based on a convolution of the first de-reverberated output signal and a second portion of a second synthetic impulse response. The first synthetic impulse response is time delayed in comparison to the second synthetic impulse response.

In another embodiment, the audio signal circuitry generates a third improved reverberation component using the second de-reverberated output signal and generates a third de-reverberated output signal with a third reverberation suppression based on the reverberant speech signal and the third improved reverberation component.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while the audio channels were described as being sound pick-up channels that use acoustic microphones, in some cases a non-acoustic microphone or vibration sensor that detects a bone conduction of the talker, may be added to form the primary sound pick up channel (e.g., where the output of the vibration sensor is combined with that of one or more acoustic microphones). The description is thus to be regarded as illustrative instead of limiting.

What is claimed is:

1. A method for reverberation suppression in an audio device comprising:
   determining a first estimated reverberation component of a reverberant speech signal that is measured by at least one microphone of the audio device;
   generating a first de-reverberated output signal with a first reverberation suppression based on the reverberant speech signal and the first estimated reverberation component that is based on a first synthetic impulse response;
   generating a second improved reverberation component using the entire first de-reverberated output signal as an input of a second synthetic impulse response; and
   generating a second de-reverberated output signal with a second reverberation suppression based on the reverberant speech signal and the second improved reverberation component.

2. The method of claim 1, wherein the first estimated reverberation component is based on a convolution of the reverberant speech signal and a second portion of the first synthetic impulse response without being based on a first portion of the first synthetic impulse response.

3. The method of claim 2, wherein the first estimated reverberation component and the second improved reverberation component are based on a reverberation time $T_{60}$ that is defined as a time for energy in a reverberant room to decay by 60 dB.

4. The method of claim 3, wherein the reverberation time $T_{60}$ is a frequency dependent term that adjusts an exponential decay as a function of frequency.

5. The method of claim 3, wherein the second improved reverberation component is based on a convolution of the first de-reverberated output signal and a second portion of the second synthetic impulse response without being based on a first portion of the second synthetic impulse response.

6. The method of claim 5, wherein the first synthetic impulse response is time delayed in comparison to the second synthetic impulse response.

7. The method of claim 1, further comprising:
   generating a third improved reverberation component using the second de-reverberated output signal; and
   generating a third de-reverberated output signal with a third reverberation suppression based on the reverberant speech signal and the third improved reverberation component.

8. An audio device comprising:
   at least one microphone for measuring a reverberant speech signal; and
   audio signal processing circuitry coupled to the microphone, the audio signal processing circuitry to determine a first estimated reverberation component of the reverberant speech signal that is received by the microphone, to generate a first de-reverberated output signal with a first reverberation suppression based on the reverberant speech signal and the first estimated reverberation component that is based on a first synthetic impulse response, to generate a second improved reverberation component using the entire first de-reverberated output signal as an input of a second synthetic impulse response, and to generate a second de-reverberated output signal with a second reverberation suppression based on the reverberant speech signal and the second improved reverberation component.

9. The audio device of claim 8, wherein the first estimated reverberation component is based on a convolution of the reverberant speech signal and a second portion of the first synthetic impulse response without being based on a first portion of the first synthetic impulse response.

10. The audio device of claim 9, wherein the first and second reverberation components are based on a reverberation time $T_{60}$ that is defined as a time for energy in a reverberant room to decay by 60 dB.

11. The audio device of claim 10, wherein the reverberation time $T_{60}$ is a frequency dependent term that adjusts an exponential decay as a function of frequency.

12. The audio device of claim 9, wherein the second improved reverberation component is based on a convolution of the first de-reverberated output signal and a second portion of the second synthetic impulse response.

13. The audio device of claim 12, wherein the first synthetic impulse response is time delayed in comparison to the second synthetic impulse response.

14. The audio device of claim 8, wherein the audio signal circuitry to generate a third improved reverberation component using the second de-reverberated output signal and to generate a third de-reverberated output signal with a third reverberation suppression based on the reverberant speech signal and the third improved reverberation component.

15. An apparatus comprising:
a means for measuring a reverberant speech signal; and
a means for audio signal processing to determine a first estimated reverberation component of the reverberant speech signal that is received by a microphone, to generate a first de-reverberated output signal with a first reverberation suppression based on the reverberant speech signal and the first estimated reverberation component that is based on a first synthetic impulse response, to generate a second improved reverberation component using the entire first de-reverberated output signal as an input of a second synthetic impulse response, and to generate a second de-reverberated output signal with a second reverberation suppression based on the reverberant speech signal and the second improved reverberation component.

16. The apparatus of claim 15, wherein the first estimated reverberation component is based on a convolution of the reverberant speech signal and a second portion of the first synthetic impulse response without being based on a first portion of the first synthetic impulse response.

17. The apparatus of claim 16, wherein the first and second reverberation components are based on a reverberation time $T_{60}$ time, which is a frequency dependent term that adjusts an exponential decay as a function of frequency.

18. The apparatus of claim 17, wherein the second improved reverberation component is based on a convolution of the first de-reverberated output signal and a second portion of the second synthetic impulse response.

19. The apparatus of claim 18, wherein the first synthetic impulse response is time delayed in comparison to the second synthetic impulse response.

20. A method for reverberation suppression with an audio device comprising:
determining an estimated reverberation component of a reverberant speech signal that is measured by at least one microphone of the audio device; and
generating a de-reverberated output signal with a reverberation suppression based on the reverberant speech signal and the estimated reverberation component, wherein the estimated reverberation component is based on the reverberant speech signal and a second reverberant portion of a synthetic impulse response without being based on a first direct portion of the synthetic impulse response.

21. The method of claim 20, wherein the estimated reverberation component is computed by determining a convolution of the reverberant speech signal and the second reverberant portion of the synthetic impulse response.

22. The method of claim 21, wherein the estimated reverberation component is determined in a time domain, wherein the synthetic impulse response is based on a reverberation time $T_{60}$ that is defined as a time for energy in a reverberant room to decay by 60 dB, wherein the reverberation time $T_{60}$ is a frequency dependent term that adjusts an exponential decay as a function of frequency.

23. The method of claim 21, wherein the synthetic impulse response depends upon frequency with reverberation decreasing for higher frequencies.

24. The method of claim 20, wherein the reverberant speech signal includes a first portion that corresponds to a direct path from a user to the microphone and a second portion that corresponds to other paths from the user to the microphone based on reflections from walls, a ceiling, a floor, or other objects.

* * * * *